United States Patent
Pescod et al.

(10) Patent No.: US 9,682,785 B2
(45) Date of Patent: Jun. 20, 2017

(54) DATA RETRIEVAL SYSTEM IN AN AIRCRAFT WITH DATA STORED DURING A FLIGHT AND WIRELESSLY TRANSMITTED TO A GROUND SYSTEM AFTER LANDING USING A ELECTROMAGNETICALLY SEALED DEVICE WHICH CAN BE OPEN OR CLOSED

(71) Applicant: BAE SYSTEMS plc, London (GB)

(72) Inventors: Christopher Ralph Pescod, Chelmsford (GB); Shahbaz Nawaz, Chelmsford (GB); Lydia Ann Hyde, Chelmsford (GB); Shaun William Waddington, Preson (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/892,984

(22) PCT Filed: May 21, 2014

(86) PCT No.: PCT/GB2014/051550
§ 371 (c)(1),
(2) Date: Nov. 20, 2015

(87) PCT Pub. No.: WO2014/188181
PCT Pub. Date: Nov. 27, 2014

(65) Prior Publication Data
US 2016/0214734 A1     Jul. 28, 2016

(30) Foreign Application Priority Data

May 23, 2013  (EP) .................................... 13250059
May 23, 2013  (GB) ................................... 1309288.7

(51) Int. Cl.
H04W 4/00      (2009.01)
B64D 45/00     (2006.01)
H04B 7/185     (2006.01)

(52) U.S. Cl.
CPC ......... *B64D 45/00* (2013.01); *H04B 7/18506* (2013.01); *B64D 2045/0065* (2013.01)

(58) Field of Classification Search
CPC   H04B 7/18506; H04B 7/18504; G07C 5/008; G07C 5/0808

(Continued)

(56) References Cited

U.S. PATENT DOCUMENTS 5,231,409 A    7/1993  Astier et al.
5,670,742 A    9/1997  Jones
(Continued)

FOREIGN PATENT DOCUMENTS

DE    102005061336 A1   6/2007
WO       0007126         2/2000

(Continued)

OTHER PUBLICATIONS

International Search Report and Written Opinion received for Patent Application No. PCT/GB2014/051548, mailed on Jul. 17, 2014. 9 pages.

(Continued)

*Primary Examiner* — Sonny Trinh
(74) *Attorney, Agent, or Firm* — Finch & Maloney PLLC

(57) ABSTRACT

An aircraft-side aircraft data retrieval system and method, comprising: a data storage device (14) located in a first location, for example a bay (8), in a aircraft (2) adapted to, during a flight, store data acquired during the flight; and wireless apparatus (18) comprising an antenna (28), at least the antenna (28) being located in a second location, for example an undercarriage bay, in the aircraft (2) that is (Continued)

different to the first location, the wireless apparatus (18) adapted to wirelessly transmit, after landing, the stored data to a ground-side data retrieval system (6); the second location (10) being a location that can have a closed or open configuration and which will be in the closed configuration for at least a majority of the flight and in the open configuration, for a purpose other than retrieving the stored data, after the aircraft (2) has landed.

19 Claims, 5 Drawing Sheets

(58) Field of Classification Search
USPC ....... 455/431, 67.11, 98; 701/14, 33.4, 31.5, 701/120
See application file for complete search history.

(56) References Cited

U.S. PATENT DOCUMENTS

| | | | |
|---|---|---|---|
| 5,739,786 A | 4/1998 | Greenspan et al. | |
| 5,783,772 A | 7/1998 | Takahashi et al. | |
| 6,025,795 A | 2/2000 | Hulderman et al. | |
| 6,154,637 A | 11/2000 | Wright et al. | |
| 6,181,990 B1 | 1/2001 | Grabowsky et al. | |
| 6,536,711 B1 | 3/2003 | Conway, Jr. et al. | |
| 6,781,968 B1 | 8/2004 | Colella et al. | |
| 6,876,905 B2* | 4/2005 | Farley | H04B 7/18506 244/1 R |
| 6,898,492 B2* | 5/2005 | de Leon | G07C 5/008 244/189 |
| 7,835,734 B2 | 11/2010 | Eckert et al. | |
| 7,973,722 B1 | 7/2011 | Hill et al. | |
| 2003/0037604 A1 | 2/2003 | Poblete | |
| 2003/0130769 A1 | 7/2003 | Farley et al. | |
| 2004/0008253 A1 | 1/2004 | Monroe | |
| 2004/0027255 A1* | 2/2004 | Greenbaum | G07C 5/008 340/945 |
| 2005/0156803 A1 | 7/2005 | Soler Castany et al. | |
| 2006/0276943 A1 | 12/2006 | Anderson et al. | |
| 2007/0072639 A1 | 3/2007 | Frost et al. | |
| 2009/0179811 A1 | 7/2009 | Chou | |
| 2010/0267375 A1 | 10/2010 | Lemmon et al. | |
| 2011/0095951 A1 | 4/2011 | McCarthy et al. | |
| 2011/0257834 A1 | 10/2011 | Hebb | |
| 2011/0284683 A1 | 11/2011 | Liu | |
| 2012/0191273 A1* | 7/2012 | Jacobs | H04B 7/18508 701/3 |
| 2012/0285132 A1 | 11/2012 | Rebeyrotte et al. | |
| 2013/0083960 A1 | 4/2013 | Kostrzewski et al. | |
| 2014/0210165 A1 | 7/2014 | Gleason et al. | |
| 2016/0049019 A1* | 2/2016 | Mahalingaiah | G07C 5/008 701/33.4 |
| 2016/0119053 A1 | 4/2016 | Pescod et al. | |
| 2016/0214734 A1 | 7/2016 | Pescod et al. | |

FOREIGN PATENT DOCUMENTS

| | | |
|---|---|---|
| WO | 2011017812 A1 | 2/2001 |
| WO | 2013017844 A1 | 2/2013 |
| WO | 2014188179 A1 | 11/2014 |
| WO | 2014188180 A1 | 11/2014 |
| WO | 2014188181 A1 | 11/2014 |

OTHER PUBLICATIONS

GB Intellectual Property Office Search Report under Section 17(5) received for GB Patent Application No. 1309296.0 mailed Nov. 20, 2013. 3 pages.
Extended European Search Report received for EP Patent Application No. 13250060.4 mailed Apr. 14, 2014. 7 pages.
International Search Report and Written Opinion received for Patent Application No. PCT/GB2014/051550, mailed on Aug. 11, 2014. 9 pages.
GB Intellectual Property Office Search Report under Section 17(5) received for GB Patent Application No. 1309288.7 mailed Nov. 21, 2013. 3 pages.
Extended European Search Report received for EP Patent Application No. 13250059.6 mailed Apr. 17, 2014. 7 pages.
International Search Report and Written Opinion received for Patent Application No. PCT/GB2014/051549, mailed on Jul. 17, 2014. 10 pages.
GB Intellectual Property Office Search Report under Section 17(5) received for GB Patent Application No. 1309295.2 mailed Nov. 21, 2013. 3 pages.
Extended European Search Report received for EP Patent Application No. 13250061.2 mailed Apr. 14, 2014. 8 pages.
International Preliminary Report on Patentability received for Patent Application No. PCT/GB2014/051550, mailed on Dec. 3, 2015. 6 pages.
International Preliminary Report on Patentability received for Patent Application No. PCT/GB2014/051548, mailed on Dec. 3, 2015. 6 pages.
International Preliminary Report on Patentability received for Patent Application No. PCT/GB2014/051549, mailed on Dec. 3, 2015. 7 pages.

* cited by examiner

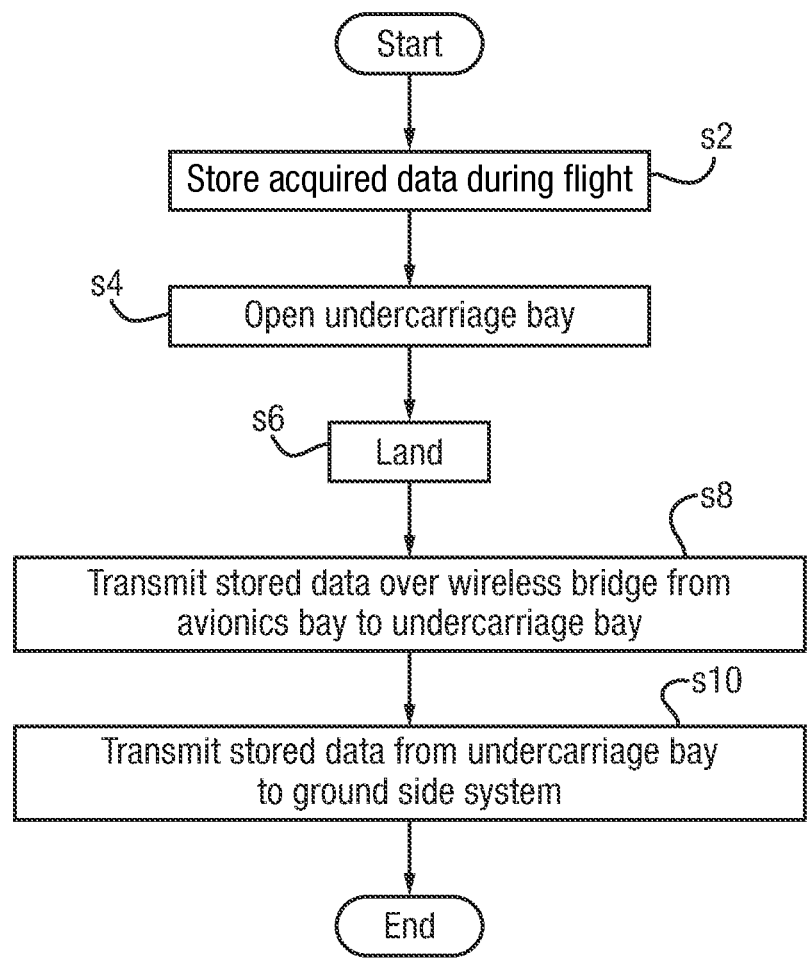

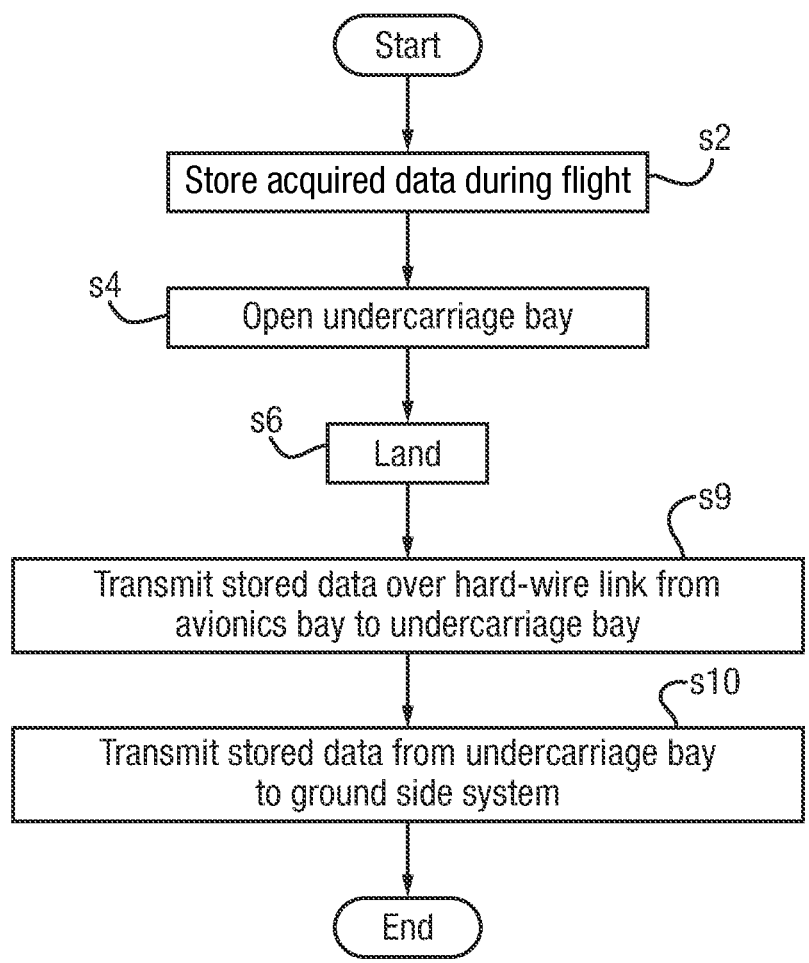

DATA RETRIEVAL SYSTEM IN AN AIRCRAFT WITH DATA STORED DURING A FLIGHT AND WIRELESSLY TRANSMITTED TO A GROUND SYSTEM AFTER LANDING USING A ELECTROMAGNETICALLY SEALED DEVICE WHICH CAN BE OPEN OR CLOSED

FIELD OF THE INVENTION

The present invention relates to the retrieval of data stored by an aircraft. The present invention relates in particular to, but is not limited to, retrieval of data acquired and stored by an aircraft during a flight.

BACKGROUND

Conventionally, during a mission, data is acquired (and/or updated) and stored by a military aircraft. In some cases, such data is stored in a storage module in an electromagnetically sealed bay of the military aircraft, with the electromagnetically sealed bay having one or more electromagnetically sealed panels. Conventionally, after one or more missions are completed, the data is retrieved by removing the sealed panel and physically accessing the data storage module, which for example may include physically removing the data storage module, or one or more storage media of a storage module, from the aircraft. Removal and then replacement of the sealed panel can lead to increased turn-around and/or maintenance times.

In the field of civilian aircraft, wireless communication of data between an aircraft and ground side equipment, whilst on the ground, is known. See for example U.S. Pat. No. 7,835,734.

SUMMARY OF THE INVENTION

In a first aspect, the invention provides an aircraft-side aircraft data retrieval system, comprising: a data storage device located in a first location in an aircraft adapted to, during a flight, store data acquired during the flight; and wireless apparatus comprising an antenna, at least the antenna being located in a second location in the aircraft that is different to the first location, the wireless apparatus adapted to wirelessly transmit, after the aircraft has landed, the stored data to a ground-side data retrieval system; wherein: the second location is a location that can have a closed or open configuration and which will be in the closed configuration for at least a majority of the flight and in the open configuration, for a purpose other than retrieving the stored data, after the aircraft has landed; and when the second location is in the open configuration the second location is less electromagnetically sealed than the first location.

The first location may be an electromagnetically sealed bay of the aircraft.

The first location may be an avionics bay of the aircraft.

The second location may be an undercarriage bay of the aircraft.

The aircraft-side aircraft data retrieval system may further comprise apparatus adapted to provide a wireless bridge between the first location and the second location.

The wireless apparatus may be adapted to wirelessly transmit, after the aircraft has landed, the stored data to a ground-side data retrieval system at a frequency in a range selected from the following ranges: (i) 50-330 GHz, (ii) 22-24 GHz.

The frequency may be in the range of 50-70 GHz.

The frequency may be in a range selected from the following ranges: (i) 50-70 GHz, (ii) 110-120 GHz, (iii) 170-190 GHz, (iv) 310-330 GHz, (v) 22-24 GHz.

The system may be for use on a military aircraft and as such the data storage device may be located in a first location on a military aircraft.

In a further aspect, the invention provides a ground-side aircraft data retrieval system, comprising: wireless apparatus adapted to wirelessly receive data acquired and stored by the aircraft during flight and transmitted after landing by the aircraft from a location in the aircraft that can have a closed or open configuration and which will be in the closed configuration for at least a majority of the flight and in the open configuration, for a purpose other than retrieving the stored data, after the aircraft has landed, using an aircraft-side data retrieval system according to any of the above aspects and options.

The ground-side aircraft data retrieval system may be located in a hand-held terminal.

In a further aspect, the invention provides an aircraft data retrieval system, comprising: an aircraft-side aircraft data retrieval system according to any of the above aspects and options; and a ground-side aircraft data retrieval system according to any of the above aspects and options.

In a further aspect, the invention provides an aircraft-side aircraft data retrieval method, comprising: during a flight by an aircraft, storing data acquired during the flight in a storage device located in a first location in the aircraft; and after the aircraft has landed, wirelessly transmitting the stored data to a ground-side data retrieval system using an antenna located in a second location in the aircraft that is different to the first location; wherein: the second location is a location that can have a closed or open configuration and which will be in the closed configuration for at least a majority of the flight and in the open configuration, for a purpose other than retrieving the stored data, after the aircraft has landed; and when the second location is in the open configuration the second location is less electromagnetically sealed than the first location.

In a further aspect, the invention provides an aircraft data retrieval method, comprising performing an aircraft-side aircraft data retrieval method according to the above aspect; and wirelessly receiving stored data transmitted during the performance of the aircraft-side aircraft data retrieval method according to the above aspect.

In a further aspect, the invention provides a program or plurality of programs arranged such that when executed by a computer system or one or more processors it/they cause the computer system or the one or more processors to operate in accordance with the above aspects and options.

In a further aspect, the invention provides a machine readable storage medium storing a program or at least one of the plurality of programs according to the above aspect.

BRIEF DESCRIPTION OF THE DRAWINGS

FIG. 4 is a process flowchart showing certain steps of an embodiment of a data retrieval process; and FIG. 5 is a process flowchart showing certain steps of a further embodiment of a data retrieval process.

DETAILED DESCRIPTION

Figure 1:
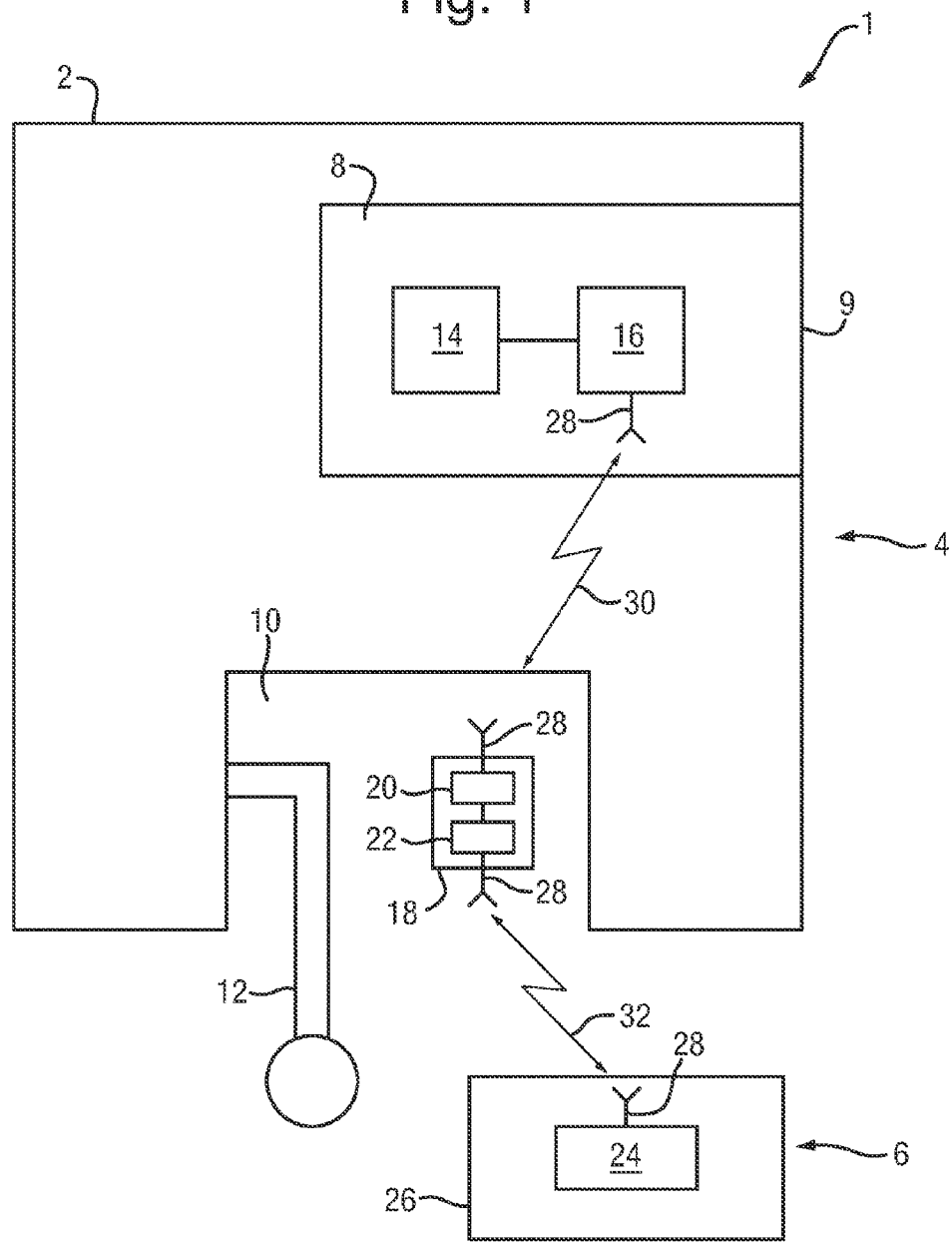
FIG. 1 is a schematic block diagram of an embodiment of a data retrieval system for use with an aircraft.

FIG. 1 is a schematic block diagram of an embodiment of a data retrieval system 1 for use with a military aircraft 2.

In this embodiment the data retrieval system 1 comprises an aircraft-side data retrieval system 4 and a ground side data retrieval system 6.

In this embodiment the aircraft 2 comprises an undercarriage bay 10 and a further bay 8. As will be described below, the data to be retrieved is stored in the further bay 8. The further bay 8 comprises an external aircraft panel 9 that is electromagnetically sealed. By way of example, in this particular embodiment the further bay 8 is an avionics bay 8.

The undercarriage bay 10 has an external panel 9 that is electromagnetically sealed when the undercarriage bay 10 is closed. In FIG. 1 the aircraft 2 is on the ground with the undercarriage bay 10 open so that its undercarriage 12 is effective. This is the primary reason the undercarriage bay 10 has been opened. However, as will be described in more detail below, use is made of the secondary aspect that as a result of being open, the undercarriage bay 10 is no longer electromagnetically sealed.

In this embodiment the aircraft-side data retrieval system 4 comprises an data storage module 14 and an avionics bay wireless system 16. The data storage module 14 and the avionics bay wireless system 16 are operably coupled to each other and both are located in the avionics bay 8.

In this embodiment the aircraft-side data retrieval system 4 further comprises an undercarriage bay wireless system 18 located in the undercarriage bay 10. The undercarriage bay wireless system 18 comprises an undercarriage bay wireless bridge module 20 and an undercarriage bay aircraft-ground link module 22. The undercarriage bay wireless bridge module 20 and the undercarriage bay aircraft-ground link module 22 are operably coupled to each other.

In this embodiment the ground side data retrieval system 6 comprises a ground side wireless system 24 located in a hand-held terminal 26.

In this embodiment, each of the avionics bay wireless system 16, the undercarriage bay wireless bridge module 20, the undercarriage bay aircraft-ground link module 22, and the ground side wireless system 24 comprises a respective antenna 28. The avionics bay wireless system 16 and the undercarriage bay wireless bridge module 20 are operably coupled together by a wireless bridge link 30 provided via their respective antennas 28. The undercarriage bay aircraft-ground link module 22 and the ground side wireless system 24 are operably coupled together by a data retrieval system wireless link 32 provided via their respective antennas 28.

The above arrangement is described in more detail as follows.

In this embodiment, data is acquired on the aircraft 2 during a flight and stored at the data storage module 14. The data storage module 14 may be implemented in any conventional fashion, including one or more processors and one or more storage media. Additionally, in this embodiment, the data storage module 14 comprises a conventional input and output arrangement.

The data storage module 14 is operably coupled (in this embodiment via a hard-wired link) to the avionics bay wireless system 16. In conventional arrangements, after the aircraft lands after a mission, the avionics bay 8 would be opened and a conventional data storage module would be physically coupled to a ground side data retrieval system. In contrast, in this embodiment, a wireless link is established between the data storage module 14 and a ground side data retrieval system 6 (the latter comprises the hand held terminal 26 in this embodiment), and the data is retrieved from the data storage module 14 over the wireless link. In this embodiment, the wireless link comprises a chain comprising three wireless nodes. The first node is the avionics bay wireless system 16.

The second node is the undercarriage bay wireless system 18, which is located in the undercarriage bay 10. A wireless bridge link 30 is provided between the avionics bay wireless system 16, via its antenna 28, and the undercarriage bay wireless bridge module 20 (in particular its antenna 28) of the undercarriage bay wireless system 18. In this embodiment the wireless bridge link 30 operates at a frequency around of approximately 60 GHz, although this need not be the case in other embodiments.

The undercarriage bay wireless bridge module 20 is operably coupled (in this embodiment via a hard-wired link) to the undercarriage bay aircraft-ground link module 22.

The third node is the ground side wireless system 24, which is located in the hand held terminal 26. A data retrieval system wireless link 32 is provided between the undercarriage bay aircraft-ground link module 22, via its antenna 28, and the ground side wireless system 24 (in particular its antenna 28). In this embodiment the data retrieval system wireless link 32 operates at a frequency of approximately 60 GHz, although this need not be the case in other embodiments.

In operation, data acquired or updated during the flight is stored at the data storage module 14. After the aircraft 2 has landed, the hand held terminal is brought into a position that allows adequate wireless transmission/reception between the undercarriage bay aircraft-ground link module 22 and the ground side wireless system 24. Since in this embodiment the wireless frequency employed is approximately 60 GHz, at which value there is relatively high atmospheric attenuation, this range is about 5 meters maximum. This provides good security against eavesdropping.

The undercarriage bay 10 is an example of a part of the aircraft that will normally be in a closed state during most of the flight, thereby typically providing part of an in-flight sealed wireless barrier, but which is in an opened state for other reasons after the aircraft has landed.

Consequently, one advantage that tends to be provided by virtue of locating the last aircraft-side node of the wireless chain in such a part of the aircraft is that the provision of the data retrieval system does not affect the wireless containment properties of the aircraft in flight (i.e. the external electromagnetic sealing is not interrupted during flight, including not at all during the whole flight for the avionics bay, and for the undercarriage bay interruption only occurring close to landing when the undercarriage bay is opened in preparation for landing).

Another advantage that tends to be provided by virtue of locating the last aircraft-side node of the wireless chain in such a part of the aircraft is that there is no need to open any panel of the aircraft just for the sake of allowing higher wireless connectivity on the ground, since the undercarriage bay is already open (i.e. the extent to which wireless transmission from the undercarriage bay will be attenuated is reduced by virtue of the bay being open). For example, it is noted that the avionics bay 8 does not need to be opened, with consequential delays regarding opening and later re-establishing, the electromagnetic sealing, despite this being where the data storage module 14 (and hence the stored data) is located.

The avionics bay wireless system 16 and the undercarriage bay wireless bridge module 20 together provide a wireless bridge (in particular the wireless bridge link 30) enabling data to be passed between the data storage module 14 and the undercarriage bay aircraft-ground link module 22. An advantage of operably coupling the data storage module 14 and the undercarriage bay aircraft-ground link module 22 together in this way (i.e. by provision of a wireless bridge) that tends to be provided is that there is no need to provide a hard-wired link, avoiding for example a need to undermine the electromagnetic integrity of the avionics bay 8 that may have particularly high levels of integrity of sealing of its enclosure.

Figure 2:
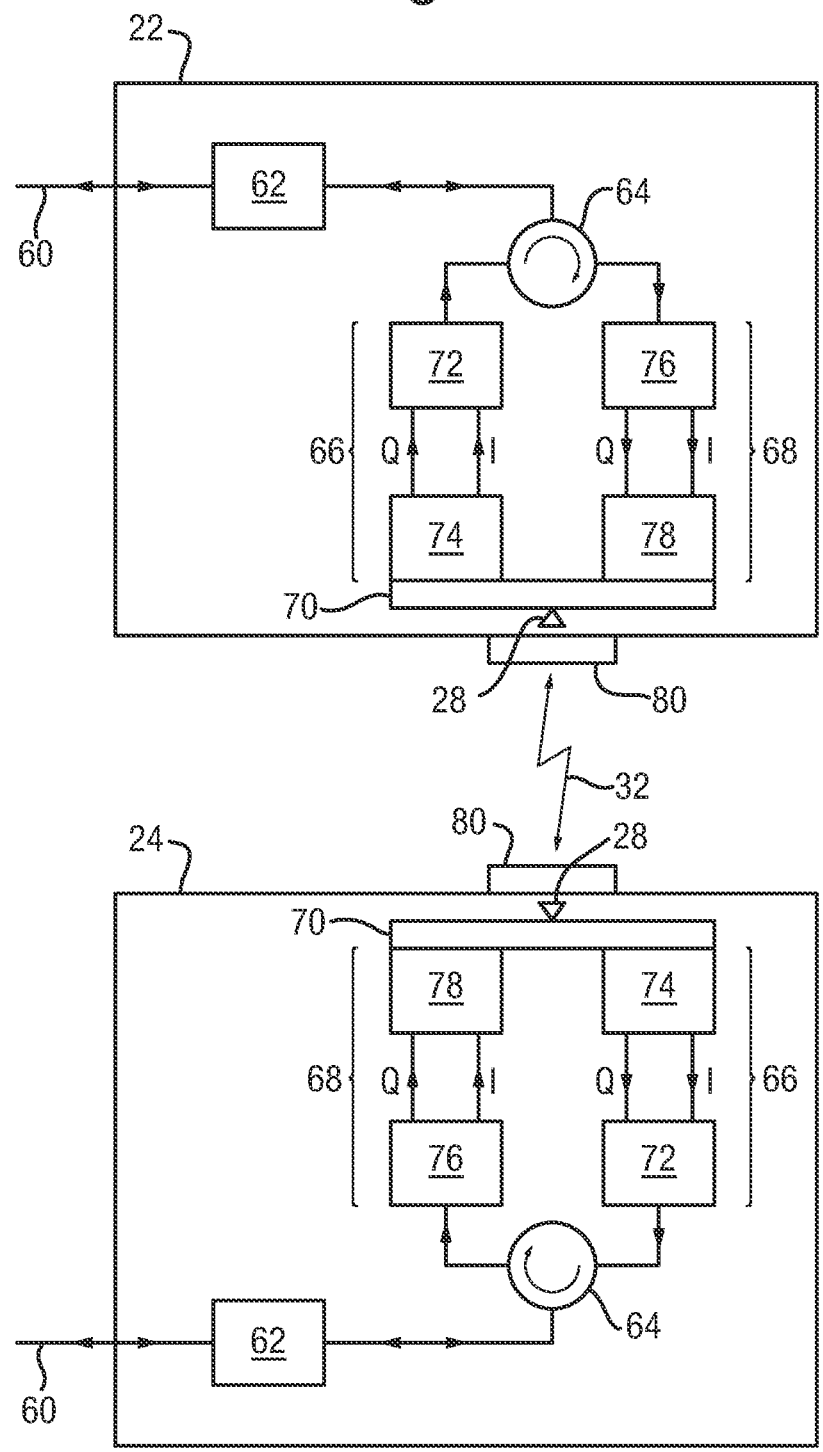
FIG. 2 is a block diagram showing further details of an undercarriage bay aircraft-ground link module and a ground side wireless system of the data retrieval system of FIG. 1.

FIG. 2 is a block diagram showing further details of the undercarriage bay aircraft-ground link module 22 and the ground side wireless system 24. Where applicable the same reference numerals are used to refer to the same elements as shown in FIG. 1. Also shown in FIG. 2 is the data retrieval system wireless link 32.

In this embodiment the undercarriage bay aircraft-ground link module 22 and the ground side wireless system 24 are the same as each other. Each comprises an Ethernet digital input/output 60, a wireless modem 62, a circulator 64, a reception branch 66, a transmission branch 68, a transmission/reception diplexer 70, an antenna 28 (which in this embodiment is a horn antenna), and a window that is transparent to the wireless frequency employed (which in this embodiment is approximately 60 GHz). The reception branch 66 comprises an In-phase and Quadrature (IQ) splitter 72 and a reception module 74 coupled to each other by two separate couplings, one for Q and one for I. The transmission branch 68 comprises an IQ splitter 76 and a transmission module 78 coupled to each other by two separate couplings, one for Q and one for I.

In this embodiment the wireless modem 62 operates at a frequency of 2.4 GHz, but other frequencies are possible, one example being in the range 1 to 6 GHz.

The Ethernet digital input/output 60 is coupled to the wireless modem 62. The wireless modem 62 is further coupled to the circulator 64. The circulator 64 is further coupled to the reception branch 66 and the transmission branch 68, more particularly to the IQ splitter 72 of the reception branch 66 and to the IQ splitter 76 of the transmission branch 68. The reception branch 66, more particularly the reception module 74 of the reception branch 66, is coupled to the transmission/reception diplexer 70. The transmission branch 68, more particularly the transmission module 78 of the transmission branch 68, is coupled to the transmission/reception diplexer 70. The transmission/reception diplexer 70 is further coupled to the horn antenna 28. Other types of antenna could also be used to provide different beamwidths and antenna gains.

The data retrieval system wireless link 32 is provided between the respective antennas 28 of the undercarriage bay aircraft-ground link module 22 and the ground side wireless system 24, including passing through the respective 60 GHz transparent windows 80. These allow the 60 GHz signals to pass through the sealed boxes in which 22 and 24 are located in this embodiment.

In this embodiment the Ethernet digital input/output 60 of the undercarriage bay aircraft-ground link module 22 is coupled (over a hard wired link) to an Ethernet digital input/output of the undercarriage bay wireless bridge module 20.

In this embodiment the Ethernet digital input/output 60 of the ground side wireless system 24 is coupled to any suitable end-use arrangement. For example, the Ethernet digital input/output 60 may be coupled to one or more storage media (not shown) comprised by the hand held terminal 26. The one or more storage media may removable or fixed or one or more of each.

In operation, in this embodiment the each of the undercarriage bay aircraft-ground link module 22 and the ground side wireless system 24, and the arrangement of FIG. 2 as a whole, operates as follows.

At the request of the operator in control of the ground side wireless system 24, a command is issued on a data terminal connected to the Ethernet digital input/output 60 to download maintenance data from the data storage module 14. This instruction is transmitted from the ground side wireless system 24 via the data retrieval system wireless link 32 to the undercarriage bay aircraft-ground link module 22. The wireless signal is demodulated and connected by cable to the undercarriage bay wireless bridge module 20. The signal is then modulated onto a 60 Ghz carrier and then re-transmitted by the undercarriage bay wireless bridge module 20 to the receiver contained within the avionics bay wireless system 16. The Ethernet digital output from avionics bay wireless system 16 is received by the data storage module 14 over the Ethernet cable connection. On reception the data storage module 14 responds to the request to download data and transmits the data to the avionics bay wireless system 16 on the Ethernet cable connection. The data is then modulated onto a 60 GHz carrier and transmitted by the avionics bay wireless system 16 over the wireless bridge link 30 to the receiver located in the undercarriage bay wireless bridge module 20. The wireless data is then demodulated and the Ethernet data is electrically connected to the transmitter in the undercarriage bay aircraft-ground link module 22, where the Ethernet data is modulated onto a 60 GHz carrier for transmission over the data retrieval system wireless link 32 to the ground side wireless system 24. The data terminal connected to the Ethernet digital input/output 60 then receives the requested data.

The wireless modems 62 are used to convert the Ethernet digital data on port 60 to a suitable modulation for transmission over the wireless links. Coded Orthogonal Frequency Division Multiplexing modulation and coding is one preferred example in order to minimise the impact of the multiple reflections of the wireless signals 30 and 32 encountered in the avionics bay 8 and undercarriage bay 10 areas.

Wireless bridging link 30 removes the need to install additional cabling and hence the data download system can be implemented with minimum modification to the airframe.

In the above embodiments, the data storage module 14 and the undercarriage bay wireless system 18 are operably coupled together by provision of the above described wireless bridge. However, this need not be the case, and in other embodiments the data storage module 14 and the undercarriage bay aircraft-ground link module 22 may be coupled together by provision of any other suitable type of link or operable coupling. For example, they may be coupled together by provision of one or more hard-wired links.

Figure 3:
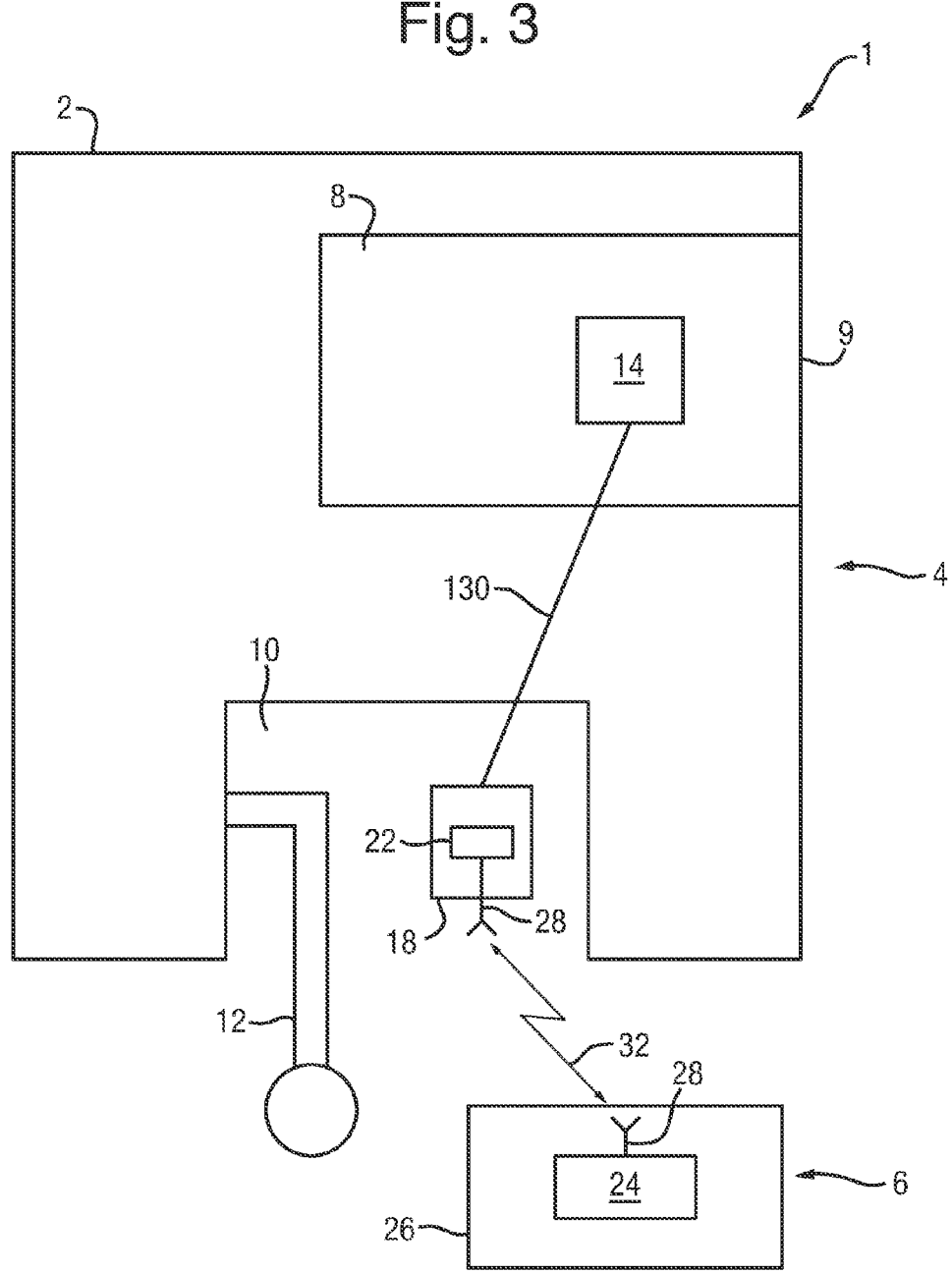
FIG. 3 is a schematic block diagram of a further embodiment of a data retrieval system for use with an aircraft.

FIG. 3 is a schematic block diagram of one such further embodiment of a data retrieval system 1 for use with the aircraft 2. Except where stated otherwise below or where consequently not possible/applicable, the data retrieval system 1 of this further embodiment (FIG. 3) comprises the same elements, operating the same way, as described for the above embodiments with reference to FIGS. 1 and 2 (and where applicable the same reference numerals are used in FIG. 3 to refer to the same elements as shown in FIGS. 1 and 2).

In this embodiment the data retrieval system 1 comprises an aircraft-side data retrieval system 4 and a ground side data retrieval system 6.

In this embodiment the aircraft 2 comprises an undercarriage bay 10 and a further bay 8. As will be described below, the data to be retrieved is stored in the further bay 8. The further bay 8 comprises an external aircraft panel 9 that is electromagnetically sealed. By way of example, in this particular embodiment the further bay 8 is an avionics bay 8.

The undercarriage bay 10 has an external panel 9 that is electromagnetically sealed when the undercarriage bay 10 is closed. In FIG. 3 the aircraft 2 is on the ground with the undercarriage bay 10 open so that its undercarriage 12 is effective. This is the primary reason the undercarriage bay 10 has been opened. However, as will be described in more detail below, use is made of the secondary aspect that as a result of being open, the undercarriage bay 10 is no longer electromagnetically sealed.

In this embodiment the aircraft-side data retrieval system 4 comprises an data storage module 14 located in the avionics bay 8.

In this embodiment the aircraft-side data retrieval system 4 further comprises an undercarriage bay wireless system 18 located in the undercarriage bay 10. The undercarriage bay wireless system 18 comprises an undercarriage bay aircraft-ground link module 22.

In this embodiment the ground side data retrieval system 6 comprises a ground side wireless system 24 located in a hand-held terminal 26.

In this embodiment, each of the undercarriage bay aircraft-ground link module 22 and the ground side wireless system 24 comprises a respective antenna 28.

In this embodiment the data storage module 14 is operably coupled via the hard-wired link 130 to the undercarriage bay aircraft-ground link module 22, which is located in the undercarriage bay 10. A data retrieval system wireless link 32 is provided between the undercarriage bay aircraft-ground link module 22, via its antenna 28, and the ground side wireless system 24 (in particular its antenna 28). In this embodiment the data retrieval system wireless link 32 operates at a frequency of approximately 60 GHz, although this need not be the case in other embodiments.

The above arrangement is described in more detail as follows.

In this embodiment, data is acquired on the aircraft 2 during a flight and stored at the data storage module 14. The data storage module 14 may be implemented in any conventional fashion, including one or more processors and one or more storage media. Additionally, in this embodiment, the data storage module 14 comprises a conventional input and output arrangement.

In conventional arrangements, after the aircraft lands after a mission, the avionics bay 8 would be opened and a conventional data storage module would be physically coupled using an Ethernet digital cable connection to a ground side data retrieval system. In contrast, in this embodiment, the data is retrieved from the data storage module 14 via the hard-wired link 130 and the data retrieval system wireless link 32.

In operation, data acquired or updated during the flight is stored at the data storage module 14. After the aircraft 2 has landed, the hand held terminal 26 is brought into a position that allows adequate wireless transmission/reception between the undercarriage bay aircraft-ground link module 22 and the ground side wireless system 24. Since in this embodiment the wireless frequency employed is approximately 60 GHz, this range is about 5 meters maximum. This provides good security against eavesdropping.

The undercarriage bay 10 is an example of a part of the aircraft that will normally be in a closed state during most of the flight, thereby typically providing part of an in-flight sealed wireless barrier, but which is in an opened state for other reasons after the aircraft has landed. Consequently, one advantage that tends to be provided by virtue of locating the last aircraft-side node of the wireless chain in such a part of the aircraft is that the provision of the data retrieval system has a reduced or minimised extent of lowering the wireless containment properties of the aircraft in flight. Another advantage that tends to be provided by virtue of locating the last aircraft-side node of the wireless chain in such a part of the aircraft is that there is no need to open any panel of the aircraft just for the sake of allowing wireless connectivity on the ground, since the undercarriage bay is already open (i.e. the extent to which wireless transmission from the undercarriage bay will be attenuated is reduced by virtue of the bay being open). For example, it is noted that the avionics bay 8 does not need to be opened, with consequential delays regarding opening and later re-establishing, the electromagnetic sealing, despite this being where the data storage module 14 (and hence the stored data) is located.

In this embodiment the undercarriage bay aircraft-ground link module 22 and the ground side wireless system 24 are the same as described above with reference to FIG. 2.

In this embodiment the Ethernet data input/output 60 of the undercarriage bay aircraft-ground link module 22 is coupled via the hard-wired link 130 to the Ethernet data input/output of the data storage module 14.

In this embodiment the Ethernet data input/output 60 of the ground side wireless system 24 is coupled to any suitable end-use arrangement. For example, the Ethernet input/output 60 may be coupled to one or more storage media (not shown) comprised by the hand held terminal 26. The one or more storage media may removable or fixed or one or more of each.

In the above embodiments, an aircraft-ground link module 22 is located in the undercarriage bay, i.e. the undercarriage bay is the selected bay for use as a bay or other enclosure that will give less attenuation after it is open, and where that bay will also be open or opened, when the aircraft 2 is on the ground, for other reasons. However, in other embodiments, a different bay or enclosure of the aircraft 2 other than the undercarriage bay 10 may be employed (as a bay that will give less attenuation after it is open), where that other bay will also be open or opened, when the aircraft 2 is on the ground, for other reasons.

In all the above embodiments the undercarriage bay aircraft-ground link module 22 and the ground side wireless system 24 are of the same type, design and specification as each other. However, this need not be the case, and in other embodiments their types and/or design and/or specifications may be different to each other. In other embodiments even when one or more of these characteristics are the same, they may be different to those described above. Examples of different possibilities include the following.

In the above embodiments the input/output 60 is Ethernet digital signals providing a bi-directional transmission path for both data and handshaking for acknowledging receipt of a data packet. In other embodiments, a simplified single direction transmission system may be implemented with transmission from the data storage module 14 to the hand held terminal 26. The data download transmission would be initiated by a different method (any suitable conventional method) compared to that described above as the initial request from the hand held terminal 26 to the data storage module 14 would not be supported with a uni-directional link.

In those of the above embodiments that include a wireless bridge, the wireless elements providing the wireless bridge, i.e. the avionics bay wireless system 16 and the undercarriage bay wireless system 18, are both of the same type, design and specification as each other and also of the same type, design and specification as the undercarriage bay aircraft-ground link module 22 and the ground side wireless system 24. However, this need not be the case, and in other embodiments one or more of these characteristics of one or both of the wireless elements providing the wireless bridge may be different to each other and/or different to those of one or both of the undercarriage bay aircraft-ground link module 22 and the ground side wireless system 24. In the above embodiments, a 60 GHz transmission frequency has been used for the wireless bridge link 30 and the data retrieval system wireless link 32. In other embodiments a different frequency may be used for the wireless bridge link 30 compared to the data retrieval system wireless link 32. Also different modulation techniques may be adopted for the data retrieval system wireless link 32 compared to the wireless bridge link 30, for example making use of any reduced multipath conditions in the undercarriage bay 10 compared to the avionics bay 8.

More generally, by use of any of any appropriate arrangements of apparatus, including the different embodiments of apparatus described above and including the options and alternative possibilities discussed in relation thereto, the following embodiments of data retrieval processes may be implemented.

FIG. 4 is a process flowchart showing certain steps of an embodiment of a data retrieval process.

At step s2, acquired data is stored in the avionics bay 8 during flight. In this embodiment the data is stored at the data storage module 14.

At step s4, during the approach for landing, the undercarriage bay 10 is opened. This reduces the extent to which later wireless transmission from the undercarriage bay 10 will be attenuated. In this embodiment this step is of course performed before the aircraft 2 lands. However, in other embodiments, a different bay or enclosure of the aircraft 2 other than the undercarriage bay 10 will be employed (as a bay that will give less attenuation after it is open), where that other bay will also be open or opened when the aircraft 2 is on the ground, for other reasons. If this is a bay that does not need to be opened until after the aircraft 2 is on the ground, then a step equivalent to s4 (i.e. opening the relevant bay) may instead be performed after landing rather than before (i.e. after step s6).

Returning to the embodiment shown in FIG. 4, at step s6 the aircraft 2 lands.

Thereafter, when the aircraft 2 is stationery, steps s8 and s10 are performed as follows.

At step s8, the stored data is transmitted over a wireless bridge link 30 provided by a wireless bridge from the avionics bay 8 to the undercarriage bay 10. In this embodiment this step is performed by the avionics bay wireless system 16 and the undercarriage bay wireless system 18, but this need not be the case, and in other embodiments other apparatus may be used.

At step s10, the stored data is transmitted from the undercarriage bay 10 to a ground side system. In this embodiment this step is performed by the undercarriage bay wireless system 18 and, as the ground side system, the ground side wireless system 24. However, this need not be the case, and in other embodiments other apparatus may be used.

In other embodiments, step s8 and/or step s10 may instead be performed when the aircraft 2 is taxiing, or may instead be performed over a period of time in which for part of that period of time the aircraft 2 is stationery and for part of that period of time the aircraft 2 is taxiing.

FIG. 5 is a process flowchart showing certain steps of a further embodiment of a data retrieval process.

At step s2, acquired data is stored in the avionics bay 8 during flight. In this embodiment the data is stored at the data storage module 14.

At step s4, the undercarriage bay is opened. This reduces the extent to which later wireless transmission from the undercarriage bay 10 will be attenuated. The discussion above regarding step s4 with reference to FIG. 4 (regarding alternative bays and whether before or after landing) also applies to step s4 in this embodiment.

At step s6 the aircraft 2 lands.

Thereafter, when the aircraft 2 is stationery, steps s9 and s10 are performed as follows.

At step s9, the stored data is forwarded from the avionics bay 8 to the undercarriage bay 10 over a hard-wired link 130. In this embodiment this step is performed by the data storage module 14 and the undercarriage bay wireless system 18 via the hard-wired link 130, but this need not be the case, and in other embodiments other apparatus may be used.

At step s10, the stored data is transmitted from the undercarriage bay 10 to a ground side system. In this embodiment this step is performed by the undercarriage bay wireless system 18 and, as the ground side system, the ground side wireless system 24. However, this need not be the case, and in other embodiments other apparatus may be used.

In other embodiments, step s9 and/or step s10 may instead be performed when the aircraft 2 is taxiing, or may instead be performed over a period of time in which for part of that period of time the aircraft 2 is stationery and for part of that period of time the aircraft 2 is taxiing.

In the above embodiments the wireless links are provided at a frequency of approximately 60 GHz, which has a relatively high extent of atmospheric attenuation. A preferred frequency range is 50-70 GHz. A more preferred frequency range is 55-65 GHz.

In other embodiments the frequency may be at other frequency ranges that are not within the range 50-70 GHz, but which are instead in the vicinity of other frequency values that display a relatively high extent of atmospheric attenuation. Preferred ranges include, for example, 22-24 GHz, 110-120 GHz, 170-190 GHz, 310-330 GHz, or more generally 50-330 GHz.

However, the frequency need not be at a value that has a relatively high extent of atmospheric attenuation, and in other embodiments other frequencies outside any of the above mentioned preferred ranges may be used.

When more than one aircraft is to be provided with the above described data retrieval systems 1, then different aircraft may be allocated different frequencies for their respective data retrieval system wireless links. Optionally this may also be the case, in those embodiments with a wireless bridge, for their respective wireless bridge links 30. In some embodiments, use of 60 GHz or higher frequencies offers a wide bandwidth so that multiple non interfering channels can be accommodated.

In the above embodiments, during flight, data is stored at the data storage module 14. In other embodiments, other apparatus may be provided in addition to the data storage module 14 and take part in the activity of storing the data. For example, one or more additional processors and/or one or more separate storage media may be used. In yet further embodiments, other apparatus may be used instead of the data storage module, for example other types of processors and/or other separate storage media. In those embodiments where more than one apparatus is used, one or more of them may be located in different parts of the aircraft compared to the others. Indeed, in yet further embodiments, all the relevant apparatus may be located in a region of the aircraft other than a bay or compartment that is electromagnetically sealed in its entirety, for example in one that is at least sealed relative to the outside of the aircraft even if not sealed relative to one or more other regions inside the aircraft.

More generally, apparatus, including the systems and modules described above, and other apparatus, including apparatus for implementing the above described processes, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. An aircraft-side aircraft data retrieval system, comprising:
   a data storage device located in a first location in an aircraft and adapted to, during a flight, store data acquired during the flight; and
   a first wireless apparatus comprising an antenna, at least the antenna being located in an undercarriage bay of the aircraft that is different to the first location, the first wireless apparatus adapted to wirelessly transmit, after the aircraft has landed, the stored data to a ground-side data retrieval system,
   wherein:
      the undercarriage bay can have a closed or open configuration and which will be in the closed configuration, for electromagnetically sealing the undercarriage bay, for at least a majority of the flight and in the open configuration, for effecting an undercarriage, after the aircraft has landed; and
      when the undercarriage bay is in the open configuration the undercarriage bay is less electromagnetically sealed than the first location.

2. The aircraft-side aircraft data retrieval system according to claim 1, wherein the first location is an electromagnetically sealed bay of the aircraft.

3. The aircraft-side aircraft data retrieval system according to claim 1, wherein the first location is an avionics bay of the aircraft.

4. The aircraft-side aircraft data retrieval system according to claim 1, further comprising an apparatus adapted to provide a wireless bridge between the first location and the undercarriage bay.

5. The aircraft-side aircraft data retrieval system according to claim 1, wherein the first wireless apparatus is adapted to wirelessly transmit, after the aircraft has landed, the stored data to the ground-side data retrieval system at a frequency in a range selected from the following ranges: (i) 50-330 GHz, (ii) 22-24 GHz.

6. The aircraft-side aircraft data retrieval system according to claim 5, wherein the frequency is in the range of 50-70 GHz.

7. The aircraft-side aircraft data retrieval system according to claim 5, wherein the frequency is in a range selected from the following ranges: (i) 50-70 GHz, (ii) 110-120 GHz, (iii) 170-190 GHz, (iv) 310-330 GHz, (v) 22-24 GHz.

8. The aircraft-side aircraft data retrieval system according to claim 1, wherein the aircraft-side aircraft data retrieval system is for use on a military aircraft and the aircraft is the military aircraft.

9. An aircraft data retrieval system, comprising:
   the aircraft-side aircraft data retrieval system according to claim 1; and
   the ground-side data retrieval system, comprising:
      a second wireless apparatus adapted to wirelessly receive the data acquired and stored by the aircraft-side aircraft data retrieval system during the flight and transmitted by the first wireless apparatus from the undercarriage bay of the aircraft after the aircraft has landed.

10. An aircraft-side aircraft data retrieval method, comprising:
    during a flight by an aircraft, storing data acquired during the flight in a storage device located in a first location in the aircraft; and
    after the aircraft has landed, wirelessly transmitting the stored data to a ground-side data retrieval system using an antenna located in an undercarriage bay of the aircraft that is different to the first location,
    wherein:
       the undercarriage bay can have a closed or open configuration and which will be in the closed configuration, for electromagnetically sealing the undercarriage bay, for at least a majority of the flight and in the open configuration, for effecting an undercarriage, after the aircraft has landed; and
       when the undercarriage bay is in the open configuration the undercarriage bay is less electromagnetically sealed than the first location.

11. A ground-side data retrieval system, comprising:
    a wireless apparatus adapted to wirelessly receive data acquired, stored, and transmitted by an aircraft performing the aircraft-side aircraft data retrieval method according to claim 10.

12. The ground-side data retrieval system according to claim 11, located in a hand-held terminal.

13. An aircraft data retrieval method, comprising:
    performing the aircraft-side aircraft data retrieval method according to claim 10; and
    wirelessly receiving the stored data transmitted during the performance of the aircraft-side aircraft data retrieval method according to claim 10.

14. A non-transitory computer program product including one or more computer readable mediums encoded with instructions that when executed by one or more processors cause an aircraft-side aircraft data retrieval process to be carried out, the process comprising:
    during a flight by an aircraft, storing data acquired during the flight in a storage device located in a first location in the aircraft; and
    after the aircraft has landed, wirelessly transmitting the stored data to a ground-side data retrieval system using an antenna located an undercarriage bay in the aircraft that is different to the first location,
wherein:
the undercarriage bay can have a closed or open configuration and which will be in the closed configuration, for electromagnetically sealing the undercarriage bay, for at least a majority of the flight and in the open configuration, for effecting an undercarriage, after the aircraft has landed; and
when the undercarriage bay is in the open configuration the undercarriage bay is less electromagnetically sealed than the first location.

15. The computer program product according to claim 14, wherein the first location is one of an electromagnetically sealed bay of the aircraft or an avionics bay of the aircraft.

16. The computer program product according to claim 14, wherein the wirelessly transmitting of the stored data to the ground-side data retrieval system includes wirelessly transmitting, after the aircraft has landed, the stored data to the ground-side data retrieval system at a frequency in a range selected from the following ranges: (i) 50-330 GHz, (ii) 22-24 GHz.

17. The computer program product according to claim 16, wherein the frequency is in the range of 50-70 GHz.

18. The computer program product according to claim 16, wherein the frequency is in a range selected from the following ranges: (i) 50-70 GHz, (ii) 110-120 GHz, (iii) 170-190 GHz, (iv) 310-330 GHz, (v) 22-24 GHz.

19. The computer program product according to claim 16, wherein the aircraft is a military aircraft and the computer program product is installed in the military aircraft.

* * * * *